UNITED STATES PATENT OFFICE.

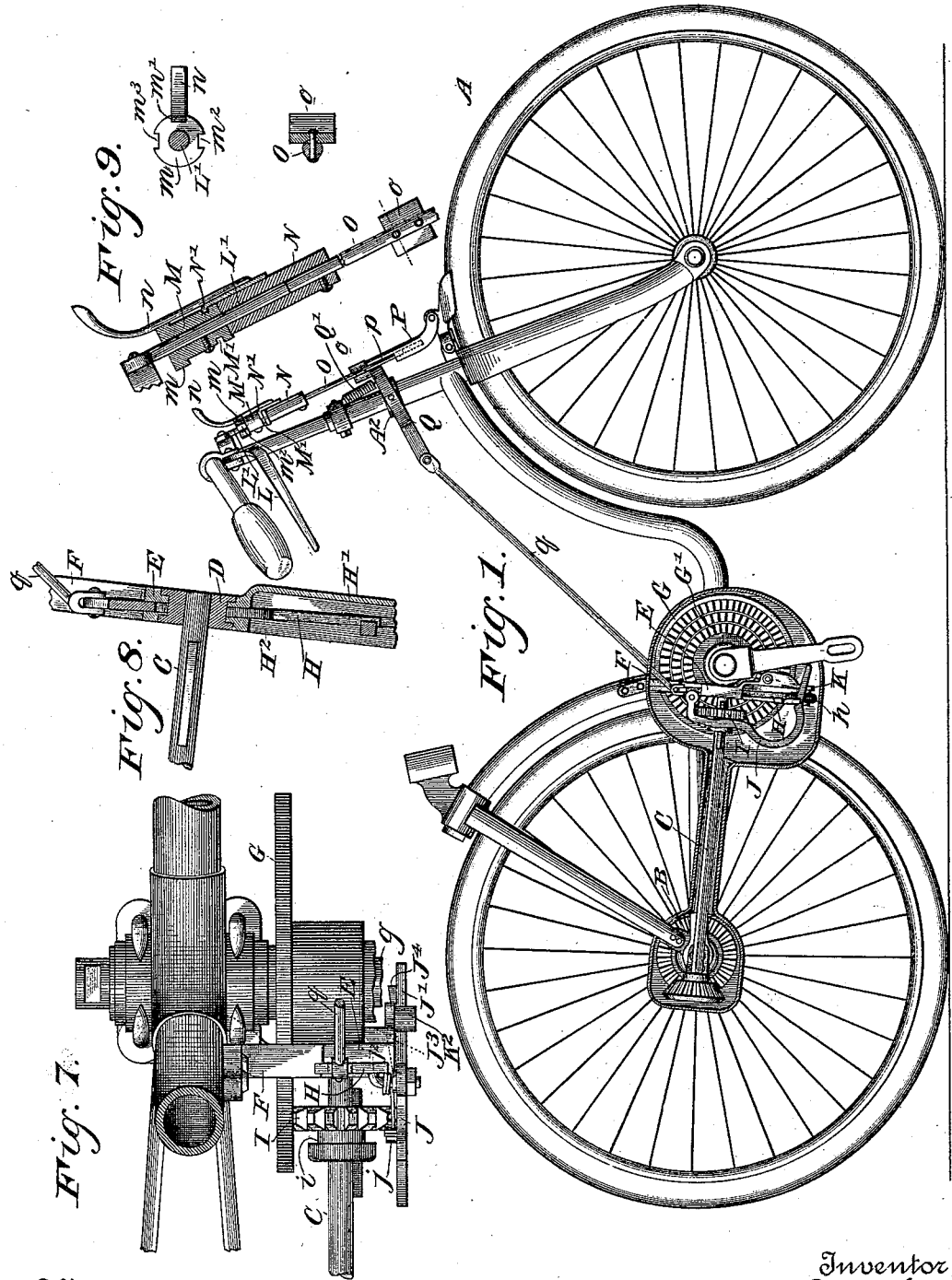

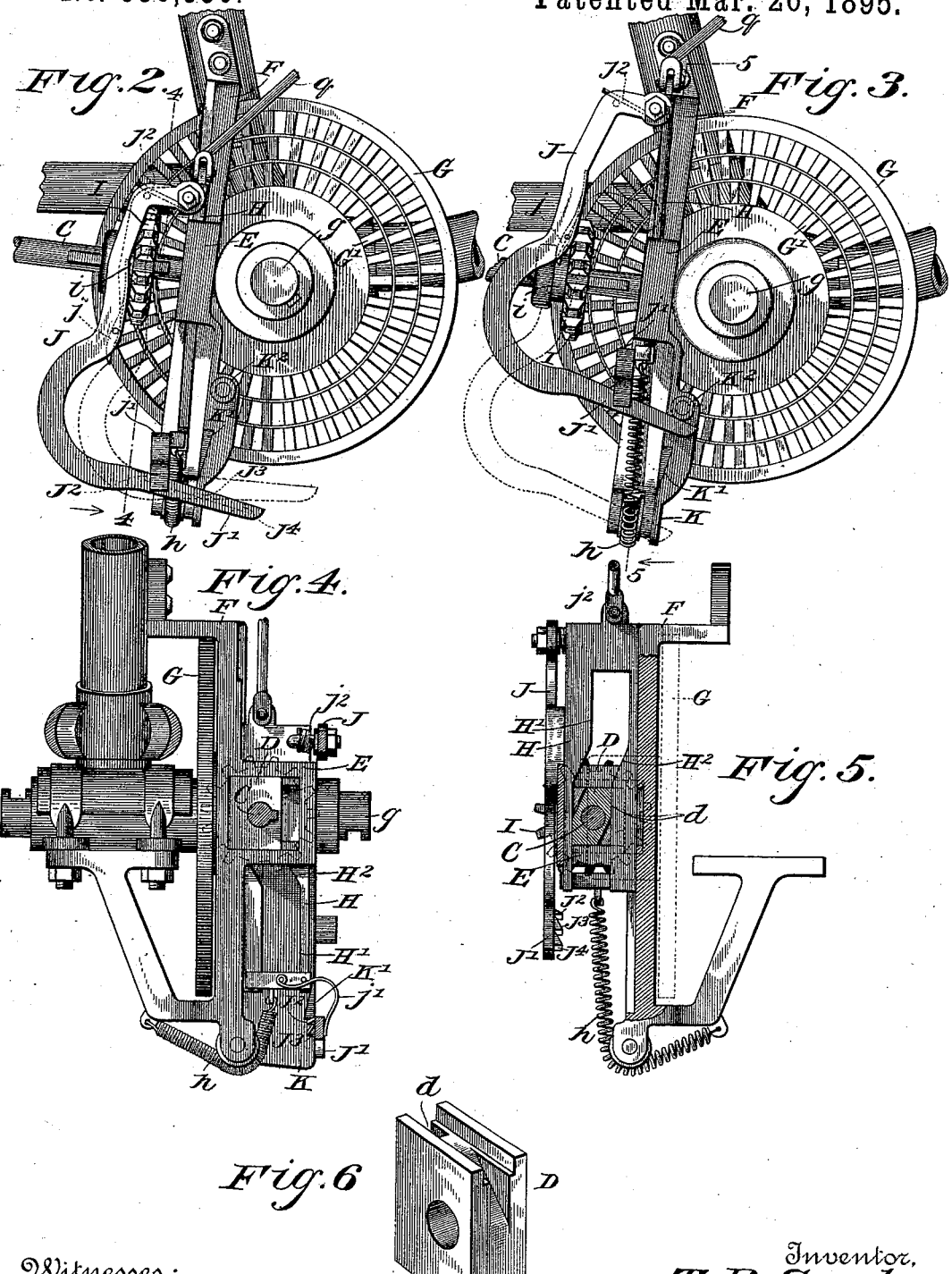

TILGHMAN B. SNYDER, OF SNYDERS, PENNSYLVANIA.

BICYCLE DRIVING-GEAR.

SPECIFICATION forming part of Letters Patent No. 536,550, dated March 26, 1895.

Application filed October 30, 1894. Serial No. 527,482. (No model.)

*To all whom it may concern:*

Be it known that I, TILGHMAN B. SNYDER, of Snyders, in the county of Schuylkill and State of Pennsylvania, have invented certain new and useful Improvements in Bicycle Driving-Gear; and I do hereby declare that the following is a full, clear, and exact description thereof, reference being had to the accompanying drawings, and to the letters of reference marked thereon, which form part of this specification.

This invention is an improvement in variable speed driving gear for bicycles, and its object is to enable the gearing to be shifted at the will of the rider into high, medium, or low speed, enabling him to ride with more economy of power than is possible with a single speed gearing.

The invention consists in the combinations and constructions of parts set forth in the claims, and is illustrated in the machine shown in the accompanying drawings, which is described in detail as follows:

Figure 1 is a side view of a bicycle, showing my improved variable speed gearing. Fig. 2 is an enlarged side view of the gearing in "medium" speed position, showing the gear-shifting lever in its lowest position in full lines, and in the "thrown off" position, by the aid of dotted lines, which it assumes when pulled upward. Fig. 3 is a similar view showing the lever in full lines in position to shift the gearing into "high" speed, and in dotted lines the position it maintains while being lowered and until it is again drawn upward. Fig. 4 is a sectional view of the gearing on line 4—4 Fig. 2. Fig. 5 is a sectional view thereof on line 5—5 Fig. 3. Fig. 6 is a detail of the box. Fig. 7 is a plan view of the variable speed gearing. Fig. 8 is a detail vertical section through the slide and box of the gearing. Fig. 9 is a group of sectional details of the shifting levers.

In the drawings, A represents an ordinary safety bicycle, having a bevel wheel B on its rear axle, meshing with a similar wheel on a shaft C, the rear end of which is journaled in a bearing attached to the rear fork as shown, while its front end is journaled in a sliding box D which is mounted in a slotted guide-frame E supported in a bracket F attached to the central portion of the bicycle frame, and supporting the box D beside the outer face, and near the hub, of a slot-gear wheel G, which is journaled on the pedal shaft $g$, the latter being journaled in the usual position on the main frame.

The box D is movable toward or from the face of gear G by means of a vertically movable slide H which plays through a guide slot in frame E, at right angles to box D, which latter is slotted at $d$ to fit the edges of the slot H' in slide H, as shown. The slot H has a cam portion $H^2$ at its upper end, which when the slide is moved upward forces box D and the front end of shaft C outward, away from the face of gear G, thereby drawing the pinion I on the front end of shaft C out of engagement with the slot-teeth of gear G and keeping it out of engagement therewith so long as the slide is raised. The slide is raised by means hereinafter described, or other convenient way, and is pulled down by a spring $h$, as shown.

In the hub of pinion I is a groove $i$, with which engages a cam $j$ on a shifting lever J, which latter is pivoted at its upper end to the top of slide H, and curves rearward and downward behind pinion I, and then forward beyond, and beside the edge of a plate K secured to the bracket F below the guide E.

The lower end J' of lever J has three forwardly pointing teeth $J^2$, $J^3$, $J^4$, on its side adjoining plate K, said teeth being adapted to engage the edge of said plate and hold the lever in one of three positions as hereinafter described, until the slide and lever are raised. A spring $j'$ is arranged to swing lever J forward whenever its teeth are disengaged from plate K, and another spring $j^2$ is arranged to press the lower end of the lever continually against the edge of plate K so that its teeth will engage said plate.

In the outer face and rear edge of plate K and near its center a vertical double beveled notch K' is made as best shown in Figs. 2, 3, and 4. As the lever J is drawn upward whichever of its teeth happens to be engaged with the edge of plate K will slip into the lower end of notch K', and as the lever rises the tooth will gradually ride up on the side of the notch until it is clear of the edge of the plate K whereupon the spring, springs lever J forward until its forward movement is arrested by the next tooth or last tooth $J^2$ on the lever J, or other suitably arranged limiting stop. When lever J is pulled above notch K' its end J' contacts with a cam piece, or roller, $K^2$ secured to the plate K', and upon the farther upper movement of the cam lever $K^2$ causes it to swing backward against the tension of the spring.

In the machine shown the slot gear has three concentric series of slot-teeth, with either of which pinion I, may be engaged to vary the speed.

The manner of shifting the pinion into engagement with either series of slot teeth of gear G is accomplished by the mechanism described as follows: Normally pinion I, is in engagement with the innermost circle of slot-teeth G', when the slide H is lowered, and lever J is swung forward to its farthest extent, the last tooth $J^2$ engaging the edge of plate K; while the cam J' is opposite but entirely out of engagement with groove $i$ on the hub of pinion I. If now slide H be drawn upward the pinion I, will be drawn outward out of engagement with the teeth of gear G, and simultaneously bring groove $i$ into engagement with the cam J' on lever J, this lever being raised with the slide, but does not swing forward as it is already at its limit, and when it contacts cam $K^2$ it swings backward, causing cam J' to shift pinion I, backward on shaft C, more or less, according to the amount of vertical movement of the lever, until its teeth are opposite the central circle of teeth $G^2$ in gear G, or, if the lever be drawn fully upward, opposite the outer circle of teeth $G^3$. For convenience we will presume lever J raised to its limit and hence pinion I brought opposite teeth $G^3$, and tooth $J^4$ has engaged the edge of plate K. Then as the slide and lever are lowered the pinion I, is moved toward gear G into engagement with teeth $G^3$ of gear G, disengaging cam J', while lever J, descends locked in its rearwardly swung position by tooth $J^4$. It will be observed that owing to the peculiar shape of notch K', when the lever J, moves down its teeth will not be disengaged from plate K, because if they slip over the lower edge of the side wall of the slot they strike the front vertical wall thereof and are directed back to the rear edge of plate, while in ascending the teeth first strike the front wall and pressing thereagainst move away from the rear edge of the plate, and at the same time are raised clear of such edge by the upwardly slant of the side wall, of the slot. Therefore in descending, the teeth of lever J remain locked to the plate K, while in ascending they are disengaged. Upon the next upward movement of slide and lever J pinion I is first drawn out of engagement with teeth $G^3$. Then lever J, being released by notch K' as described swings forward until tooth $J^3$ engages plate K, thereby sliding pinion I, opposite the teeth $G^2$. Then if the slide and lever are lowered as described pinion I, will mesh with teeth $G^2$. If now the slide and lever are again raised notch K' will release tooth $J^3$, and the lever will swing forward to its limit shifting pinion I, opposite teeth G',—its first position. To shift pinion I, from teeth G' into engagement with teeth $G^2$ the slide and lever are not drawn upward to the full extent. The rear journal bearing for shaft C should be such as will allow a slight oscillatory movement of the shaft, to prevent strain on the shaft when its front end is swung outward. So long as the slide is raised, even partly, the pinion I, is held out of engagement with the slot gear. Consequently the rider can "coast" with his feet on the pedals, and can shift from "low" to "medium" speed by a slight upward pull of the slide, and to "high" by still farther raising the slide; and can shift from "high" to "medium," and from "medium" to "low" by raising and lowering the slide. All the shifting can be accomplished by pulls on a single rod, and for convenience I employ the following means for raising and lowering the slide, by the "brake" lever:

L designates the brake lever pivoted to the handle bar as usual. To one end of this lever is pivoted a short rod L' upon which is rigidly secured a sleeve M having an annular groove M' near its lower edge and a flange $m$ on its upper edge, in which flange is a front notch $m'$ and opposite side notches $m^2$, $m^3$. Below sleeve M is another sleeve N loosely slipped on the lower end of rod L' and adjustably fastened to the upper end of a rod O the lower end of which loosely enters the upper end of a socketed or tubular rod P attached to the brake shoe, as shown. On the upper end of sleeve N is a flange N' which engages the groove M' so that the sleeves are held together but the latter (N) is rotatable on the former (M). To sleeve N is also secured a spring catch $n$, adapted to engage with either notch $m'$, $m^2$, $m^3$, and lock the sleeves together. On rod O, just above the rod P is a lug $o$, which will engage the upper end of rod P when rod O is turned to a certain position and depressed, and when the rod O is turned to another position will not engage the rod P the upper end of which is cut away at one side, as at $p$, to avoid engagement with the lug when the rod O is turned so that the lug is next the steering shaft.

Pivoted on the sleeve $A^2$, through which passes the steering fork is a lever Q, slotted to embrace the shaft. A spring Q' is attached to the front end of said lever and its rear end is connected by a rod $q$ with the upper end of slide H.

By turning sleeve N and rod O until lug $o$ is wholly over lever Q and locking the parts in such position by engaging catch $n$ with notch $m^2$ upon raising the outer end of lever L the lever Q will be oscillated so as to raise the slide H, but the brake shoe will be unaffected. When catch $n$ is engaged with central notch $m'$ the lug $o$ will engage with both lever Q and the rod P so that the slide can be raised and the brake applied simultaneously. When catch n is engaged with notch m the lug will only operate the brake.

If desired slide N might be operated by a lever and connections independently of the brake lever.

In practice the gearing will be housed or covered in but such housing is omitted in the drawings for the sake of clearness.

I do not confine myself to the precise construction shown in drawings, but

What I claim as new is—

1. The combination of the pedal shaft, the gear thereon, the sliding box beside said gear the shaft journaled in said box, and the pinion adjustably mounted on said shaft meshing with said gear; with the vertically movable slide engaging said box adapted to move it so as to throw the pinion into or out of mesh with the gear, and means for shifting the pinion on the shaft as the slide is raised substantially as described.

2. The combination of the pedal shaft, the gear thereon, the pinion meshing with said gear; and means for throwing the pinion into and out of mesh with the gear; with the vertically movable and swinging lever adapted to engage the pinion when it is drawn upward and shift it radially of the gear, substantially as described.

3. The combination of the multiple gear and means for rotating it, the pinion adapted to engage said gear, and means for moving said pinion laterally into or out of engagement with said gear; with a reciprocating lever adapted to engage said pinion when it is out of mesh with the gear, and means whereby said lever is swung as it is reciprocated in one direction whereby it is caused to shift the pinion radially of the gear, and whereby it is locked when shifted until it is returned to first position, substantially as described.

4. The combination of a multiple gear, a pinion adapted to mesh therewith; and means for shifting said pinion into or out of mesh with said gear; with a reciprocating lever, adapted to engage said pinion when it is out of mesh with the gear and shift it radially of the gear as the lever is drawn upward, means for swinging the lever as it is drawn upward, and a locking plate arranged to engage teeth on the end of lever and hold it in the position to which it was swung while it is lowered, substantially as described.

5. The combination with the gear, the pinion, and means for throwing the pinion to and from mesh with the face of the gear; with the reciprocating and swinging spring controlled lever adapted to shift the pinion substantially as described, and the slotted plate and cam adapted to control said lever, substantially as set forth.

6. The combination of the multiple gear, the pinion, and means for throwing the pinion into and out of mesh with the gear; with the reciprocating lever, as J, provided with a cam adapted to engage said pinion when it is out of mesh with the gear and move it radially of the gear, said lever also having a toothed lower end, and the stationary slotted plate adapted to engage the toothed end of the lever, and means whereby the lever is swung as it is raised and held stationary while lowered, substantially as set forth.

7. The combination of the multiple gear, the pinion, and means for throwing the pinion into and out of mesh with the gear; with the cammed lever J having toothed end J', the plate K having cam slot K' and the cam $K^2$, and means for reciprocating said lever; substantially as and for the purpose described.

8. The combination of the multiple gear, the shaft and pinion for transmitting motion therefrom; the sliding journal box in which the said shaft is journaled, the slide having a cammed slot engaging said box, and means for reciprocating said slide, whereby the pinion may be thrown out of engagement with the gear, and means for shifting the pinion longitudinally of the shaft when the slide is raised substantially as described.

9. The combination of the multiple gear, the shaft and pinion for transmitting motion therefrom; the sliding journal box in which the said shaft is journaled, the slide having a cammed slot engaging said box, and means for reciprocating said slide, whereby the pinion may be thrown out of engagement with the gear, and mechanism substantially as described, whereby the pinion is automatically shifted radially of the gear when thrown out of mesh therewith, substantially as and for the purpose specified.

10. The combination with the variable speed gearing the lever Q pivoted to the main frame, and connections for shifting the gear upon and by the movement of said lever; with the brake-rod and its operating lever, and the adjustable lug on the brake rod adapted to engage and operate lever Q when depressed, substantially as described.

11. The combination of the variable gear driving mechanism, the lever Q and connections for shifting the gear; the brake shoe, and its rod P with the rotary rod O having a lug o adapted to be shifted by turning the rod into engagement with lever Q, or rod P, or with both lever Q and rod P, means for reciprocating rod O and for turning it as desired, substantially as described.

12. The combination of the pedal shaft, the multiple-gear thereon, the shaft for transmitting motion from said gear to the rear wheel journaled in a box movable toward or from the face of the gear, a pinion splined on said shaft adapted to mesh with the gear; the slide having a cam-slot engaging said box whereby the pinion is thrown out of mesh when the slide is raised, and the spring controlled lever pivoted to said slide adapted to engage and shift the pinion on the shaft when the slide is raised, substantially as described.

13. The combination of the multiple gear, the pinion meshing therewith, the movable box in which the shaft carrying the pinion is journaled, the slide H for shifting said box so as to disengage the pinion from the gear; the lever J reciprocating with the slide, having a toothed end J', and the fixed plate K having slot K' and cam K², all substantially as and for the purpose set forth.

14. The combination of the pedal shaft, the gear G thereon, the bracket F, the box D mounted in said bracket, the slotted slide H engaging said box, the shaft C journaled in said box, and the pinion I, splined on said shaft, having a grooved hub, with the spring controlled lever J pivoted to said slide, having a cam adapted to engage the grooved hub of pinion I, also having a toothed lower end J' the stationary plate K, having slot K', and cam K², and means for reciprocating said slide, and lever, all substantially as and for the purpose set forth.

15. The combination of the lever L, rod L' sleeves M, N, constructed substantially as described, and rod O, having lug o, with the brake shoe and its rod P having shoulder p, substantially as and for the purpose specified.

16. The combination with the variable speed gearing of a bicycle, the gear shifting lever Q pivoted on the guiding fork sleeve and connections between said lever and variable gear controlling devices, with the brake-lever L, rod L' sleeves M, N, latch n, rod O, having lug o and brake shoe rod P, all constructed and arranged to operate substantially as and for the purpose set forth.

In testimony that I claim the foregoing as my own I affix my signature in presence of two witnesses.

TILGHMAN B. SNYDER.

Witnesses:
G. T. OPLINGER,
L. CAMPBELL.